US012471036B2

(12) United States Patent
Lim et al.

(10) Patent No.: US 12,471,036 B2
(45) Date of Patent: Nov. 11, 2025

(54) METHOD FOR APPLYING MSD AND APPARATUS THEREOF

(71) Applicant: LG Electronics Inc., Seoul (KR)

(72) Inventors: Suhwan Lim, Seoul (KR); Yoonoh Yang, Seoul (KR); Sangwook Lee, Seoul (KR); Jinyup Hwang, Seoul (KR); Jongkeun Park, Seoul (KR); Jinwoong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 376 days.

(21) Appl. No.: 18/011,415

(22) PCT Filed: Jul. 7, 2021

(86) PCT No.: PCT/KR2021/008660
§ 371 (c)(1),
(2) Date: Dec. 19, 2022

(87) PCT Pub. No.: WO2022/010259
PCT Pub. Date: Jan. 13, 2022

(65) Prior Publication Data
US 2023/0309027 A1    Sep. 28, 2023

(30) Foreign Application Priority Data

Jul. 10, 2020  (KR) .......... 10-2020-0085361
Oct. 21, 2020  (KR) .......... 10-2020-0137109

(51) Int. Cl.
*H04W 52/26*    (2009.01)
*H04W 52/36*    (2009.01)

(52) U.S. Cl.
CPC ....... *H04W 52/265* (2013.01); *H04W 52/367* (2013.01)

(58) Field of Classification Search
CPC ... H04W 52/265; H04W 52/367; H04W 4/40; Y02D 30/70; H04B 1/3822; H04B 1/525
See application file for complete search history.

(56) References Cited

U.S. PATENT DOCUMENTS

2018/0278283 A1*  9/2018  Lim .................. H03H 1/00
2019/0230663 A1   7/2019  Lim
2020/0169950 A1*  5/2020  Jung ................ H04B 7/0413

FOREIGN PATENT DOCUMENTS

EP    3496301    6/2019

OTHER PUBLICATIONS

CATT et al., "CR for TS38.101-1, Introduce Rx RF requirements for NR V2X con-current operation," R4-2006263, Presented at 3GPP TSG-RAN WG4 Meeting #95-e, Electronic Meeting, May 25-Jun. 5, 2020, 4 pages.
Huawei et al., "CR for TS 38.101-3: Introduction of NR V2X cross RAT requirements," R4-2009172, Presented at 3GPP TSG-WG4 Meeting #95-e, Electronic Meeting, May 25-Jun. 5, 2020, 17 pages.

* cited by examiner

*Primary Examiner* — Kibrom T Hailu
(74) *Attorney, Agent, or Firm* — Fish & Richardson P.C.

(57) ABSTRACT

A device configured to operate in a wireless system, the device including: a transceiver configured with a V2X (Vehicle to Everything), a processor operably connectable to the transceiver, wherein the processer is configured to: control the transceiver to transmit an uplink signal via operation band 20, control the transceiver to receive a sidelink signal vis operation band n38, wherein a value of Maximum Sensitivity Degradation (MSD) is applied to a reference sensitivity for receiving the sidelink signal.

14 Claims, 13 Drawing Sheets

METHOD FOR APPLYING MSD AND APPARATUS THEREOF

CROSS-REFERENCE TO RELATED APPLICATIONS

This application is a National Stage application under 35 U.S.C. § 371 of International Application No. PCT/KR2021/008660, filed on Jul. 7, 2021, which claims the benefit of Korean Patent Application No. 10-2020-0085361, filed on Jul. 10, 2020 and Korean Patent Application No. 10-2020-0137109, filed on Oct. 21, 2020. The disclosures of the prior applications are incorporated by reference in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A mobile device should be configured to satisfy a reference sensitivity power level (REFSENS) which is the minimum average power for each antenna port of the mobile device when receiving the downlink signal.

When a harmonics component and/or an intermodulation distortion (IMD) component occurs, there is a possibility that the REFSENS for the downlink signal may not be satisfied due to the uplink signal transmitted by the mobile device.

When a harmonics component and/or an intermodulation distortion (IMD) component occurs, there is a possibility that the REFSENS for the downlink signal may not be satisfied due to the uplink signal transmitted by the mobile device.

SUMMARY

Accordingly, a disclosure of the specification has been made in an effort to solve the aforementioned problem.

In accordance with an embodiment of the present disclosure, a disclosure of this specification provides A device configured to operate in a wireless system, the device comprising: a transceiver configured with a V2X (Vehicle to Everything), a processor operably connectable to the transceiver, wherein the processor is configured to: control the transceiver to transmit an uplink signal via operation band 20, control the transceiver to receive a sidelink signal vis operation band n38, wherein a value of Maximum Sensitivity Degradation (MSD) is applied to a reference sensitivity for receiving the sidelink signal, wherein based on bandwidth for receiving the sidelink signal being 10 MHz, the value of the MSD is 10.7 dB, wherein based on bandwidth for receiving the sidelink signal being 20 MHz, the value of the MSD is 7.7 dB, wherein based on bandwidth for receiving the sidelink signal being 30 MHz, the value of the MSD is 5.8 dB, wherein based on bandwidth for receiving the sidelink signal being 40 MHz, the value of the MSD is 4.7 dB.

The present disclosure can have various advantageous effects.

For example, by performing disclosure of this specification, UE can transmit signal by applying MSD value.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

DETAILED DESCRIPTION

Figure 1:
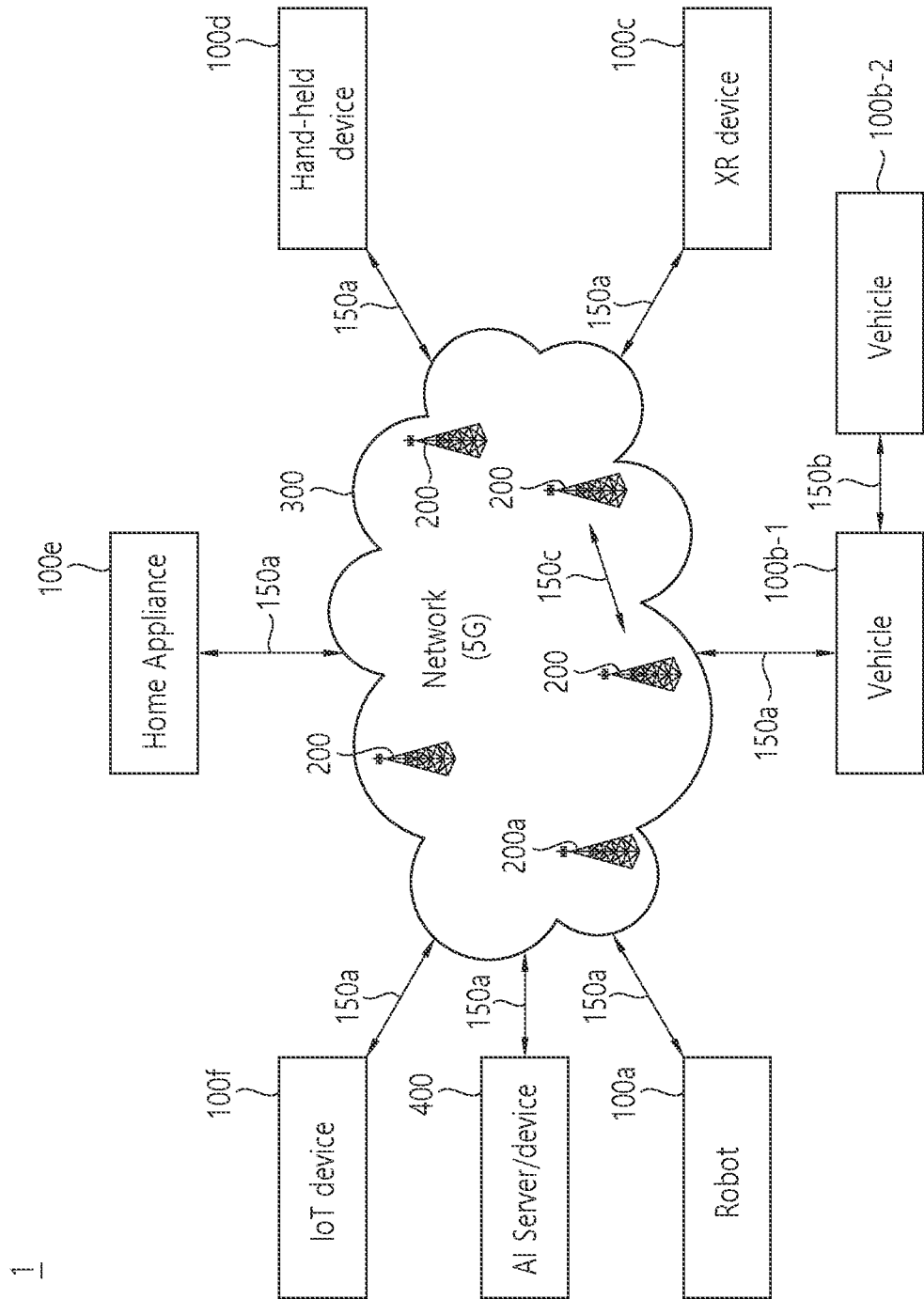
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A B and C".

In the present disclosure, slash (/) or comma (,) may mean "and/or". For example, "A/B" may mean "A and/or B". Accordingly, "A/B" may mean "only A", "only B", or "both A and B". For example, "B, C" may mean "A, B or C".

In the present disclosure, "at least one of A. and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information"

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial evolution field.

The wireless devices 100a to 100f may be connected to the network 300 via the BSs 200. An AI technology may be applied to the wireless devices 100a to 100f and the wireless devices 100a to 1100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of dying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world, MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LIE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANS) associated with small/low-power digital communication based on various specifications such as IEEE 802.15.4 and may be called various names.

Figure 2:
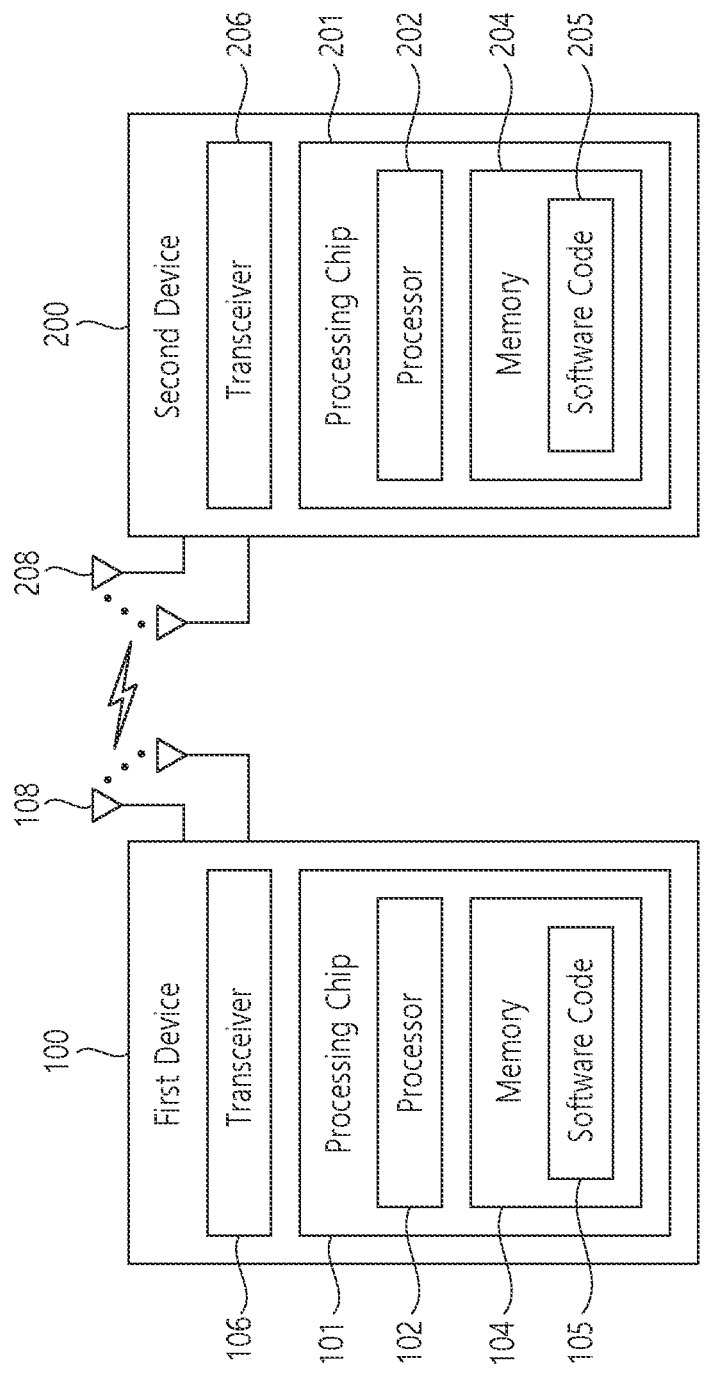
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 107 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base hand signals into the RF band signals. To this end, the one or more transceivers 106 and 206 may include (analog) oscillators and/or filters. For example, the one or more transceivers 106 and 206 can Up-CM-Veil OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
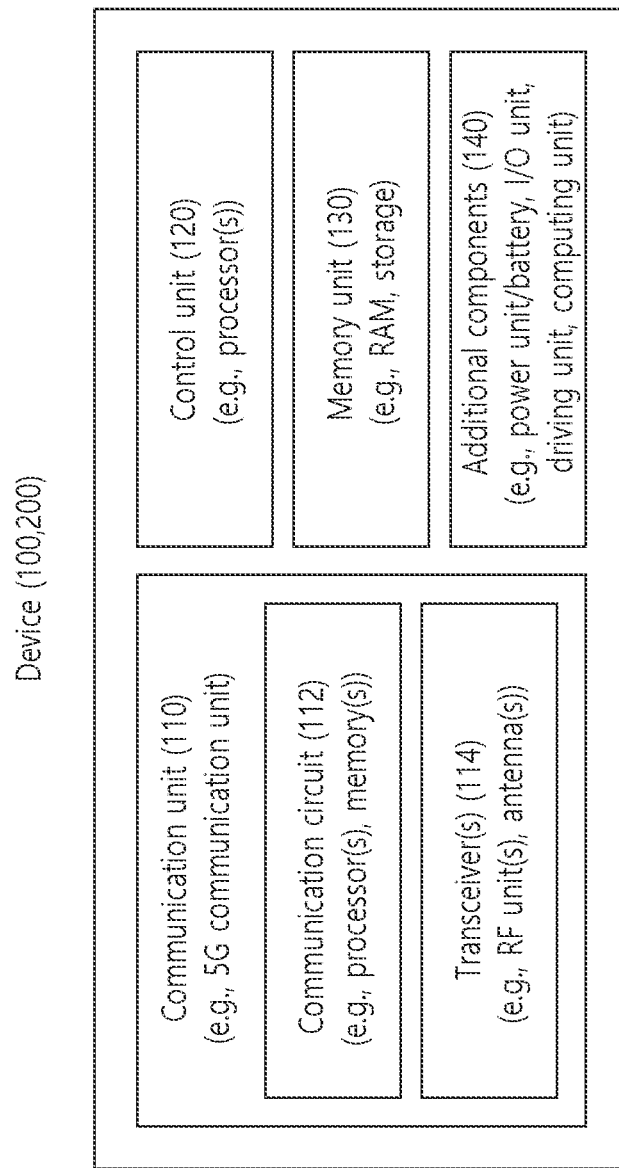
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (110) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, id a memory control processor. As another example, the memory unit 130 may be configured by a RAM, a DRAM, a ROM, a flash memory, a volatile memory, a non-volatile memory, and/or a combination thereof.

Figure 4:
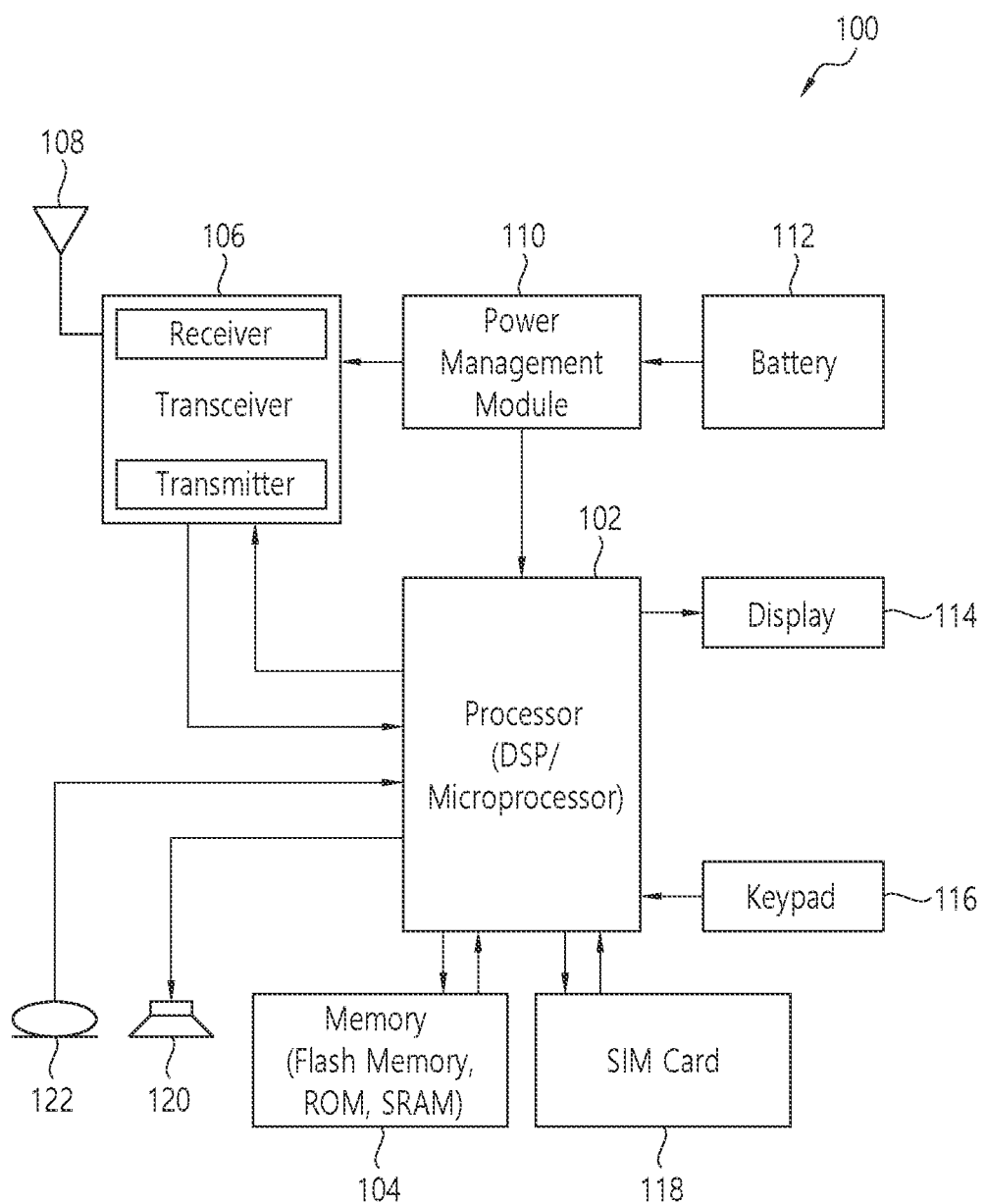
FIG. 4 shows an example of UE to which implementations of the present disclosure is applied.

FIG. 4 shows an example of to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102, via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

<Operating Band>

The LTE/LTE-A based cell operates in an Evolved Universal Terrestrial Radio Access (E-UTRA) operating band. And, the NW-based cell operates in a NR band. Here, the DC may be called as EN-DC.

The Table 3 is an example of E-UTRA operating bands.

TABLE 3

| E-UTRA Operating Band | Uplink (UL) operating band BS receive UE transmit $F_{UL\_low}$-$F_{UL\_high}$ | | | Downlink (DL) operating band BS transmit UE receive $F_{DL\_low}$-$F_{DL\_high}$ | | | Duplex Mode |
|---|---|---|---|---|---|---|---|
| 1 | 1920 MHz | — | 1980 MHz | 2110 MHz | — | 2170 MHz | FDD |
| 2 | 1850 MHz | — | 1910 MHz | 1930 MHz | — | 1990 MHz | FDD |
| 3 | 1710 MHz | — | 1785 MHz | 1805 MHz | — | 1880 MHz | FDD |
| 4 | 1710 MHz | — | 1755 MHz | 2110 MHz | — | 2155 MHz | FDD |
| 5 | 824 MHz | — | 849 MHz | 869 MHz | — | 894 MHz | FDD |
| 6 | 830 MHz | — | 840 MHz | 875 MHz | — | 885 MHz | FDD |
| 7 | 2500 MHz | — | 2570 MHz | 2620 MHz | — | 2690 MHz | FDD |
| 8 | 880 MHz | — | 915 MHz | 925 MHz | — | 960 MHz | FDD |
| 9 | 1749.9 MHz | — | 1784.9 MHz | 1844.9 MHz | — | 1879.9 MHz | FDD |
| 10 | 1710 MHz | — | 1770 MHz | 2110 MHz | — | 2170 MHz | FDD |
| 11 | 1427.9 MHz | — | 1447.9 MHz | 1475.9 MHz | — | 1495.9 MHz | FDD |
| 12 | 699 MHz | — | 716 MHz | 729 MHz | — | 746 MHz | FDD |
| 13 | 777 MHz | — | 787 MHz | 746 MHz | — | 756 MHz | FDD |
| 14 | 788 MHz | — | 798 MHz | 758 MHz | — | 768 MHz | FDD |
| 15 | | Reserved | | | Reserved | | FDD |
| 16 | | Reserved | | | Reserved | | FDD |
| 17 | 704 MHz | — | 716 MHz | 734 MHz | — | 746 MHz | FDD |
| 18 | 815 MHz | — | 830 MHz | 860 MHz | — | 875 MHz | FDD |
| 19 | 830 MHz | — | 845 MHz | 875 MHz | — | 890 MHz | FDD |
| 20 | 832 MHz | — | 862 MHz | 791 MHZ | — | 821 MHz | FDD |
| 21 | 1447.9 MHz | — | 1462.9 MHz | 1495.9 MHz | — | 1510.9 MHz | FDD |
| 22 | 3410 MHz | — | 3490 MHz | 3510 MHz | — | 3590 MHz | FDD |
| 23 | 2000 MHz | — | 2020 MHz | 2180 MHz | — | 2200 MHz | FDD |
| 24 | 1626.5 MHz | — | 1660.5 MHz | 1525 MHz | — | 1559 MHz | FDD |
| 25 | 1850 MHz | — | 1915 MHz | 1930 MHz | — | 1995 MHz | FDD |
| 26 | 814 MHz | — | 849 MHz | 859 MHz | — | 894 MHz | FDD |
| 27 | 807 MHz | — | 824 MHz | 852 MHz | — | 869 MHz | FDD |
| 28 | 703 MHz | — | 748 MHz | 758 MHz | — | 803 MHz | FDD |
| 29 | | N/A | | 717 MHz | — | 728 MHz | FDD2 |
| 30 | 2305 MHz | — | 2315 MHz | 2350 MHz | — | 2360 MHz | FDD |

TABLE 3-continued

| E-UTRA Operating Band | Uplink (UL) operating band BS receive UE transmit $F_{UL\_low}$-$F_{UL\_high}$ | | | Downlink (DL) operating band BS transmit UE receive $F_{DL\_low}$-$F_{DL\_high}$ | | | Duplex Mode |
|---|---|---|---|---|---|---|---|
| 31 | 452.5 MHz | — | 457.5 MHz | 462.5 MHz | — | 467.5 MHZ | FDD |
| 32 | | N/A | | 1452 MHz | — | 1496 MHz | FDD2 |
| 33 | 1900 MHz | — | 1920 MHz | 1900 MHz | — | 1920 MHz | TDD |
| 34 | 2010 MHz | — | 2025 MHz | 2010 MHz | — | 2025 MHz | TDD |
| 35 | 1850 MHz | — | 1910 MHz | 1850 MHz | — | 1910 MHz | TDD |
| 36 | 1930 MHz | — | 1990 MHz | 1930 MHz | — | 1990 MHz | TDD |
| 37 | 1910 MHz | — | 1930 MHz | 1910 MHz | — | 1930 MHz | TDD |
| 38 | 2570 MHz | — | 2620 MHz | 2570 MHz | — | 2620 MHz | TDD |
| 39 | 1880 MHz | — | 1920 MHz | 1880 MHz | — | 1920 MHZ | TDD |
| 40 | 2300 MHz | — | 2400 MHz | 2300 MHz | — | 2400 MHz | TDD |
| 41 | 2496 MHz | — | 2690 MHz | 2496 MHz | — | 2690 MHz | TDD |
| 42 | 3400 MHz | — | 3600 MHz | 3400 MHz | — | 3600 MHz | TDD |
| 43 | 3600 MHz | — | 3800 MHz | 3600 MHz | — | 3800 MHz | TDD |
| 44 | 703 MHz | — | 803 MHz | 703 MHz | — | 803 MHz | TDD |
| 45 | 1447 MHz | — | 1467 MHz | 1447 MHz | — | 1467 MHz | TDD |
| 46 | 5150 MHz | — | 5925 MHz | 5150 MHz | — | 5925 MHz | TDD8 |
| 47 | 5855 MHz | — | 5925 MHz | 5855 MHz | — | 5925 MHz | TDD11 |
| 48 | 3550 MHz | — | 3700 MHz | 3550 MHz | — | 3700 MHz | TDD |
| 49 | 3550 MHz | — | 3700 MHz | 3550 MHz | — | 3700 MHz | TDD16 |
| 50 | 1432 MHz | — | 1517 MHz | 1432 MHz | — | 1517 MHz | TDD13 |
| 51 | 142 MHz | — | 1432 MHz | 1427 MHz | — | 1432 MHz | TDD13 |
| 52 | 3300 MHz | — | 3400 MHz | 3300 MHz | — | 3400 MHZ | TDD |
| 53 | 2483.5 MHz | — | 2495 MHz | 2483.5 MHz | — | 2495 MHz | TDD |
| . . . | | | | | | | |
| 64 | | | | Reserved | | | |
| 65 | 1920 MHz | — | 2010 MHz | 2110 MHz | — | 2200 MHz | FDD |
| 66 | 1710 MHz | — | 1780 MHz | 2110 MHz | — | 2200 MHz | FDD4 |
| 67 | | N/A | | 738 MHz | — | 758 MHz | FDD2 |
| 68 | 698 MHz | — | 728 MHz | 753 MHz | — | 783 MHz | FDD |
| 69 | | N/A | | 2570 MHz | — | 2620 MHz | FDD2 |
| 70 | 1695 MHz | — | 1710 MHz | 1995 MHz | — | 2020 MHz | FDD10 |
| 71 | 663 MHz | — | 698 MHz | 617 MHz | — | 652 MHz | FDD |
| 72 | 451 MHz | — | 456 MHz | 461 MHz | — | 466 MHz | FDD |
| 73 | 450 MHz | — | 455 MHz | 460 MHz | — | 465 MHz | FDD |
| 74 | 1427 MHz | — | 1470 MHz | 1475 MHz | — | 1518 MHZ | FDD |
| 75 | | N/A | | 1432 MHz | — | 1517 MHz | FDD2 |
| 76 | | N/A | | 1427 MHz | — | 1432 MHz | FDD2 |
| 85 | 698 MHz | — | 716 MHz | 728 MHz | — | 746 MHz | FDD |

TABLE 3-continued

| E-UTRA Operating Band | Uplink (UL) operating band BS receive UE transmit $F_{UL\_low}$-$F_{UL\_high}$ | | Downlink (DL) operating band BS transmit UE receive $F_{DL\_low}$-$F_{DL\_high}$ | | Duplex Mode |
|---|---|---|---|---|---|
| 87 | 410 MHz | — | 415 MHz | 420 MHz | — | 425 MHz | FDD |
| 88 | 412 MHz | — | 417 MHz | 422 MHz | — | 427 MHz | FDD |

An operating band in NR is as follows. Table 4 shows examples of operating bands on FR1. Operating bands shown in Table 4 is a reframing operating band that is transitioned from an operating band of LTE/LTE-A. This operating band may be referred to as FR1 operating band.

TABLE 4

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2300 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |
| n97 | 2300 MHz-2400 MHz | N/A | SUL |
| n98 | 1880 MHz-1920 MHz | N/A | SUL |

Table 5 shows examples of operating bands on FR2. The following table shows operating bands defined on a high frequency. This operating band is referred to as FR2 operating band.

TABLE 5

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PUSCH transmitted through other component carrier through a PDCCH transmitted through a specific component carrier and/or resource allocation of a PUSCH transmitted through other component carrier different from a component carrier basically linked with the specific component carrier.

Carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 5A:
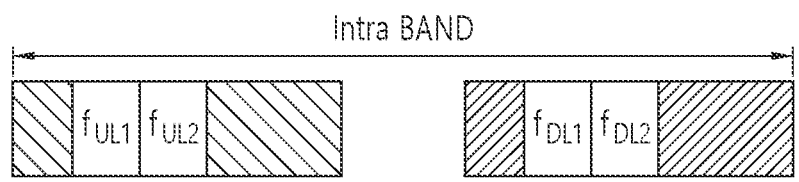
FIG. 5A illustrates a concept view of an example of intra-hand contiguous CA.
Figure 5B:
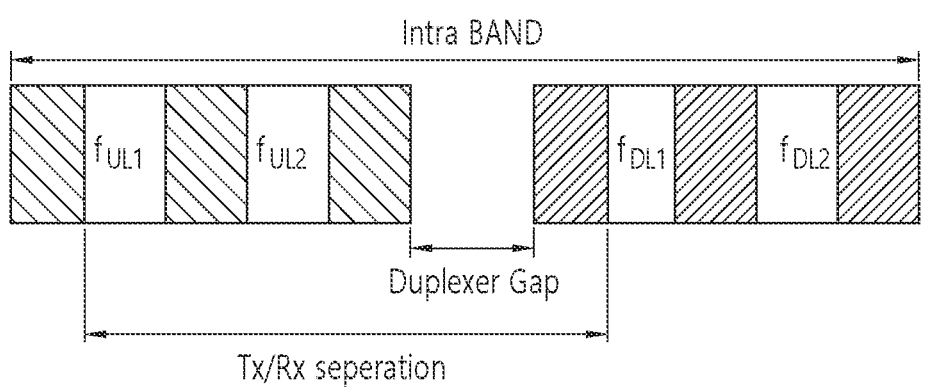
FIG. 5B illustrates a concept view of an example of intra-band non-contiguous CA.

FIG. 5A illustrates a concept view of an example of intra-hand contiguous CA. FIG. 5B illustrates a concept view of an example of intra-band non-contiguous CA.

The CA may be split into the intra-band contiguous CA shown in FIG. 5A and the intra-band non-contiguous CA shown in FIG. 5B.

Figure 6A:
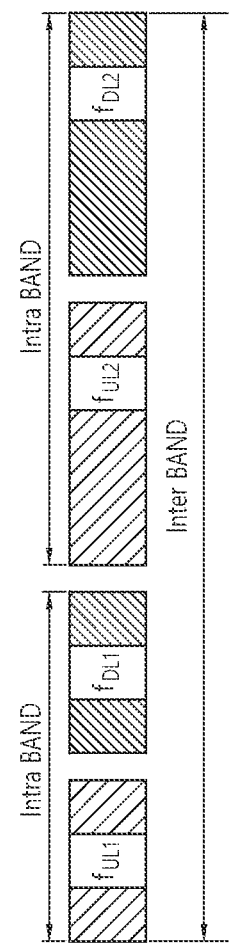
FIG. 6A illustrates a concept view of an example of a combination of a lower frequency band and a higher frequency band for inter-band CA.
Figure 6B:
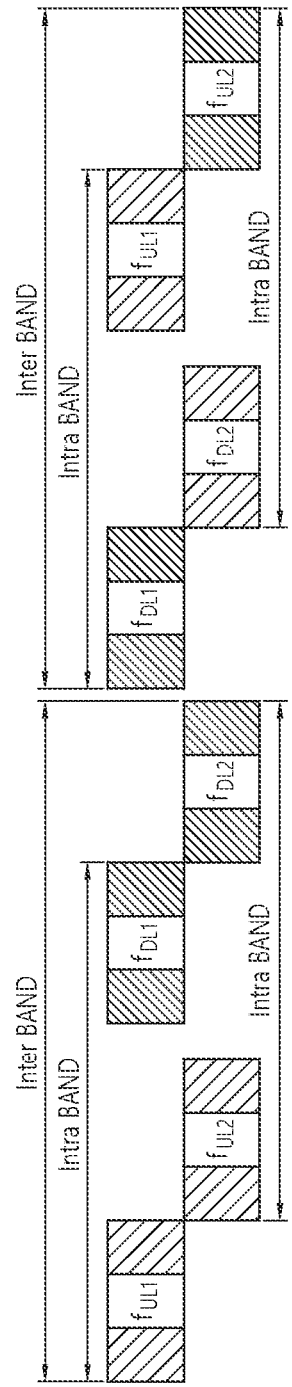
FIG. 6B illustrates a concept view of an example of a combination of similar frequency bands for inter-band CA.

FIG. 6A illustrates a concept view of an example of a combination of a lower frequency band and a higher frequency band for inter-band CA. FIG. 6B illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 6A and inter-band CA of similar frequencies that may use a common RF terminal per component carrier due to similar RE (radio frequency) characteristics as shown in FIG. 6B.

For inter-band carrier aggregation, a carrier aggregation configuration is a combination of operating bands, each supporting a carrier aggregation bandwidth class.

Figure 7:
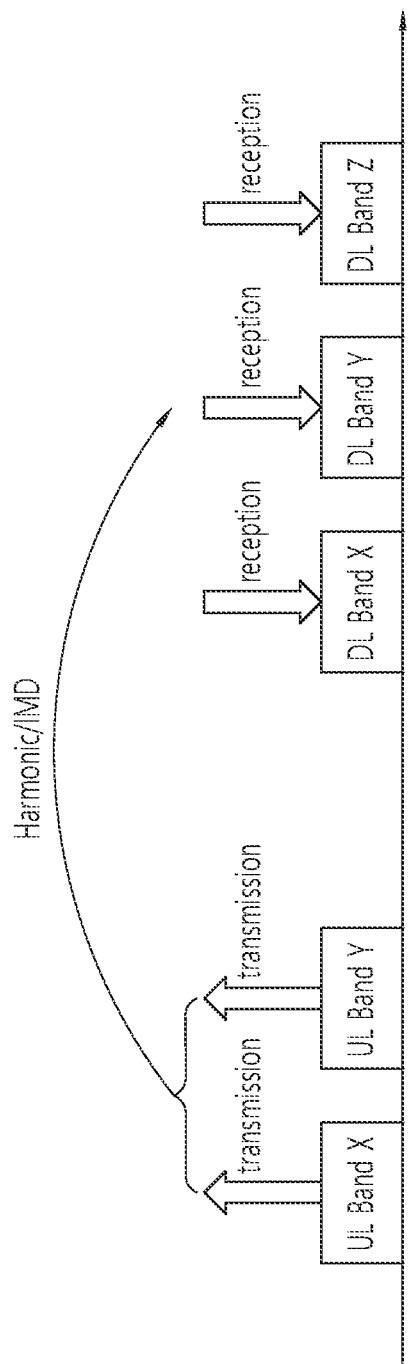
FIG. 7 illustrates an example of situation in which uplink signal transmitted via an uplink operating bands affects reception of a downlink signal via downlink operating bands.

FIG. 7 illustrates an example of situation in which uplink signal transmitted via an uplink operating bands affects reception of a downlink signal via downlink operating bands.

In FIG. 7, an Intermodulation Distortion (IMD) may mean amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at e sum and difference frequencies of the original frequencies and at sums and differences of multiples of those frequencies.

Referring to FIG. 7, an example in which a CA is configured in a terminal is shown. For example, the terminal may perform communication through the CA based on three downlink operating bands (UL Band X, Y, Z) and two uplink operating bands (DL Band X, Y).

As shown in FIG. 7, in a situation in which three downlink operating bands are configured and two uplink operating bands are configured by the CA, the terminal may transmit an uplink signal through two uplink operating bands. In this case, a harmonics component and an intermodulation distortion (IMD) component occurring based on the frequency band of the uplink signal may fall into its own downlink band. That is, in the example of FIG. 7, when the terminal transmits the uplink signal, the harmonics component and the intermodulation distortion (IMD) component may occur, which may affect the downlink band of the terminal itself.

The terminal should be configured to satisfy a reference sensitivity power level (REFSENS) which is the minimum average power for each antenna port of the terminal when receiving the downlink signal.

When the harmonies component and/or MD component occur as shown in the example of FIG. 7, there is a possibility that the REFSENS for the downlink signal may not be satisfied due to the uplink signal transmitted by the UT itself.

For example, the REFSENS may be set such that the downlink signal throughput of the terminal is 95% or more of the maximum throughput of the reference measurement channel. When the harmonics component and/or IMP component occur, there is a possibility that the downlink signal throughput is reduced to 95% or less of the maximum throughput.

Currently, in NR V2X, a standard that supports both single carrier V2X operation and con-current operation is defined. A process of standardizing is continuing in the for V2X operation in ITS spectrum as existing LTE and sidelink in existing licensed spectrum In the ease of a con-current operation in which NR Uu and NR SL operate simultaneously, interference due to simultaneous transmission may affect the reception of a magnetic signal. A harmonic trap filter (HTF) may be added to minimize this effect A trap filter educe the influence of harmonic components may be added to the transmitter, which cause maximum output power of transmitter end and sensitivity of receiver.

When 5G NR V2X con-current terminals operate simultaneously, HTF may be added to reduce the influence of interference sources. Although HTF is added, sensitivity of receiver, where harmonic affection decreases, may be more affected interference than no interference of harmonic. Therefore, insertion loss of HTF may be defined and MSD by HTF is proposed in this specification.

<Disclosure of the Present Specification>

In the present disclosure, when a terminal supporting a specific V2X_Bx_nBY transmits a transmission signal in Band X and NR Band Y at the same time, the present specification recites how much a harmonic component that affects a frequency of 2 times or 3 times the frequency of a transmission signal of a specific band X affects the self-receiving sensitivity.

When a harmonic trap filer is used to prevent and mitigate the influence, the maximum output power and reception sensitivity level of the filter affect the transmission power or reception sensitivity as much as the insertion loss. Therefore, MSD value and other values are proposed through an analysis of an RF device for determining this and an analysis of an allowable amount of relaxation of reception sensitivity.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

1. Candidate RE Architectures for Con-Current V2X UE

Figure 8A:
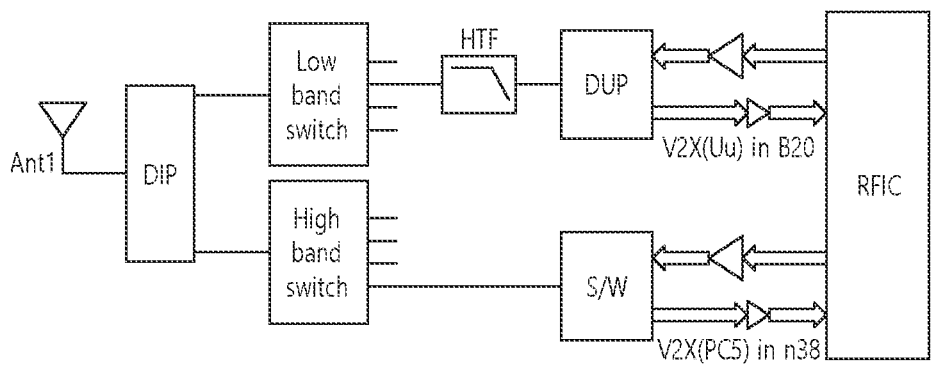
FIG. 8A illustrates Shared Antenna RF architecture and FIG. 8B illustrates Separate Antenna RF architecture.
Figure 8B:
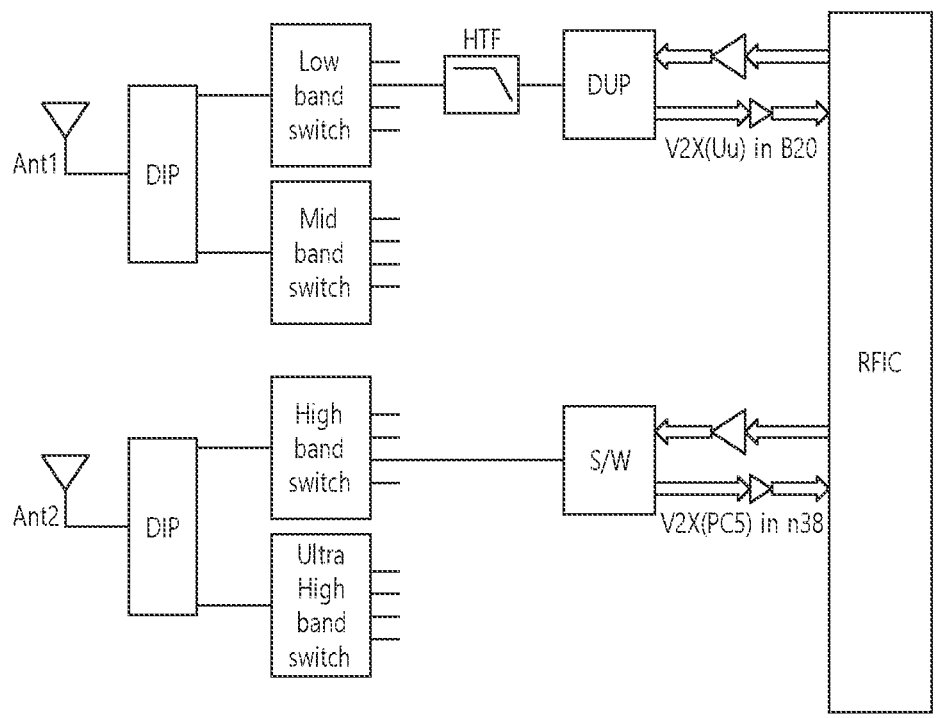

FIG. 8A illustrates Shared Antenna RF architecture and FIG. 8B illustrates Separate Antenna RF architecture.

Harmonic trap filter (HTF) for V2X_20A_n38A may reduce the 3rd harmonic problem form Band 20 transmission for both shared antenna RF architecture and separate antenna RE architecture.

Following is the delta Tib and Rib by using of harmonic trap filter which would reduce harmonic interference problem. Delta Tib is insertion loss in transmitter pass. Delta Rib is insertion loss in receiver pass.

Table 6 is Delta Tib/Rib for LTE V2X con-current band combinations.

TABLE 6

| V2X con-current band Combination | E-UTRA or V2X Operating Band | $\Delta T_{IB,c}$/ $\Delta R_{IB,c}$ [dB] | Harmonic order into B47 |
| --- | --- | --- | --- |
| V2X_3-47 | 3 | 0.0 | N/A |
| V2X_5-47 | 5 | 0.2/0.2 | 7th order |
| V2X_7-47 | 7 | 0.0 | N/A |
| V2X_8-47 | 8 | 0.0 | N/A |
| V2X_20-47 | 20 | 0.2/0.2 | 7th order |
| V2X_28-47 | 28 | 0.2/0.2 | 8th order |
| V2X_34-47 | 34 | 0.0 | N/A |

TABLE 6-continued

| V2X con-current band Combination | E-UTRA or V2X Operating Band | $\Delta T_{IB,c}/\Delta R_{IB,c}$ [dB] | Harmonic order into B47 |
|---|---|---|---|
| V2X_39-47 | 39 | 0.0 | N/A |
| V2X_41-47 | 41 | 0.0 | N/A |
| V2X_71-47 | 71 | 0.0 | N/A |

In LTE V2X UE, the specified additional ILs (insertion loss) were raised by 7th & 8th harmonics problem from the LTE Uu transmission in LTE V2X operation such as V2X_5-47, V2X_20-47 and V2X_28-47. Hence, the MSD requirements in the own Band 47 reception is not specified since the 7th order harmonic impact were eliminated by using of harmonic trap filter. However, lower order harmonic problem is more impacted to the own n38 reception of inter-band con-current V2X_20A_n38A UE.

So both the additional ILs and the self-interference problems in own n38 SL reception by 3rd harmonic from the Band 20 transmission is needed to study. Delta Tib/Rib are based on the current commercial filter ILs same as LIE V2X. The required delta Tib/Rib and MSD levels for V2X_20A_n38A UE may be proposed.

2. Delta Tib/Rib for V2X_20A_n38A

Table 7 is commercial harmonic trap filter's characteristics

TABLE 7

| Vendor | tech | freq [MHz] | IL typ. | IL Max. | Attenuation@2500~2620 typ | Attenuation@2500~2620 min. |
|---|---|---|---|---|---|---|
| A | HPF | 673~2690 | 0.37 | 0.5 | 42 | 35 |
| A | HPF | 699~2690 | 0.23 | 0.4 | 29 | 23 |
| B | HPF | 673~2690 | 0.45 | 0.5 | 45 | 37 |
| C | HPF | 698~960 | 0.28 | 0.45 | 35 | 25 |

The delta Tib/Rib of V2X band combinations are based on the HTF's additional Based on the filter characteristics, the maximum ILs is about 0.5 dB for both Tx/Rx part, so the delta Tib/Rib with 0.2 dB by shared pain approach are reused.

Shared pain approach means that total ILs will be shared to Operator and LTE Vendors as compromised solution in LTE CA (e.g. average IL is 0.46 dB the half and half will be applied to UE vendor and operator, then delta Tib/Rib will specify with 0.23 dB to 0.2 dB).

Also, the harmonic trap filter's attenuation level to protect n38 operating frequency, we assume 25 dB attenuation level when HTF is considered. It will use to derive MSD level according to RF architectures.

Based on the above RF architectures and filter characteristics, 0.2 dB Delta Tib/Rib values for V2X_20A_n38A UE may be proposed. This may be applied to the maximum output power and REFSENS relaxation as same LTE V2X 3. Self-Interference Analysis for V2X_20A_n38A FIG. 9 illustrates 3rd harmonic issues in V2X_20A_n38A con-current operation in licensed band.

Figure 9:
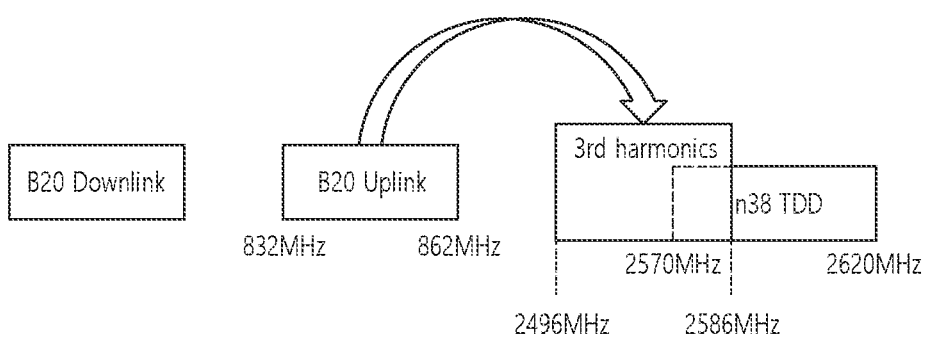
FIG. 9 illustrates 3rd harmonic issues in V2X_20A_n38A con-current operation in licensed band.

The V2X_20A_n28A has self desense problem as like LTE CA_20A-38A as shown in FIG. 9.

To analyze the 3rd order harmonics problem in own SL reception in NR n38, both RE architectures as below are considered.

Option 1: Separate Antenna Architecture for inter-band con-current V2X operation
  Option 1-1: Separate antenna with HIT
  Option 1-2: Separate antenna without HTF
Option 2: Separate Antenna Architecture for inter-band con-current V2X operation
  Option 2-1: Shared antenna with HTF
  Option 2-2: Shared antenna without HTF 4 candidate RF architectures for V2X_20A_n38A UE as shown in above options are considered. Table 7 shows the detail isolation parameters for RF components of specific V2X_20A_n38A band combination whether consider HTF or not.

1) Option 1: Separate Antenna RF architecture

Table 8 is V2X_20A_n38A UE RF FE component isolation parameters.

TABLE 8

| | Option1-1: With HTF | | | | Option1-2: Without HTF | | | |
|---|---|---|---|---|---|---|---|---|
| | Primary | | Diversity | | Primary | | Diversity | |
| Parameter | Value | H3 level | Value | H3 level | Value | H3 level | Value | H3 level |
| B20 Tx in PA output | 27.5 | | 27.5 | | 27.5 | | 27.5 | |
| B20 PA H3 attenuation | 50 | −22.5 | 50 | −22.5 | 50 | −22.5 | 50 | −22.5 |
| B20 duplexer H3 attenuation | 35 | −57.5 | 35 | −57.5 | 35 | −57.5 | 35 | −57.5 |
| Harmonic filter | 25 | −82.5 | 25 | −82.5 | 0 | −57.5 | 0 | −57.5 |
| LB switch H3 | −95 | −82.3 | −95 | −82.3 | −95 | −57.5 | −95 | −57.5 |
| Diplexer attenuation | 20 | −102.3 | 20 | −102.3 | 20 | −77.5 | 20 | −77.5 |
| Antenna isolation | 10 | −112.3 | 10 | −112.3 | 10 | −87.5 | 10 | −87.5 |
| Diplexer pathloss | 0.7 | −113.0 | 0.7 | −113.0 | 0.7 | −88.2 | 0.7 | −88.2 |
| UHB switch attenuation | 0.7 | −113.7 | 0.7 | −113.7 | 0.7 | −88.9 | 0.7 | −88.9 |
| UHB switch H3 | −125 | −113.4 | −105 | −104.4 | −125 | −88.9 | −105 | −88.8 |
| n38 Rx filter attenuation | 1.5 | −114.9 | 1.5 | −105.9 | 1.5 | −90.4 | 1.5 | −90.3 |
| n38 Rx filter H3 | −105 | −104.6 | −105 | −102.4 | −105 | −90.3 | −105 | −90.1 |
| B20 PA to n38 LNA isolation | 65 | −87.5 | 65 | −87.5 | 65 | −87.5 | 65 | −87.5 |
| Composite | | −87.4 | | −87.4 | | −85.7 | | −85.6 |
| MSD level after MRC | 10.8 dB (10 MHz) | | | | 12.6 dB (10 MHz) | | | |

1) Option 2: shared Antenna without HTF. Table 9 is V2X_20A_n38A UE RF FE component isolation parameters.

TABLE 9

|  | Option2-1: With HTF | | | | Option2-2: Without HTF | | | |
| --- | --- | --- | --- | --- | --- | --- | --- | --- |
|  | Primary | | Diversity | | Primary | | Diversity | |
| Parameter | Value | H3 level | Value | H3 level | Value | H3 level | Value | H3 level |
| B20 Tx in PA output | 27.5 |  | 27.5 |  | 27.5 |  | 27.5 |  |
| B20 PA H3 attenuation | 50 | −22.5 | 50 | 22.5 | 50 | 22.5 | 50 | −22.5 |
| B20 duplexer H3 attenuation | 35 | −57.5 | 35 | −57.5 | 35 | −57.5 | 35 | −57.5 |
| Harmonic filter | 25 | −82.5 | 25 | −82.5 | 0 | −57.5 | 0 | −57.5 |
| LB switch H3 | −95 | −82.3 | −95 | −82.3 | −95 | −57.5 | −95 | −57.5 |
| Diplexer attenuation | 20 | −102.3 | 20 | −102.3 | 20 | −77.5 | 20 | −77.5 |
| Antenna isolation | 0 | −102.3 | 0 | −102.3 | 0 | −77.5 | 0 | −77.5 |
| Diplexer pathloss | 0.7 | =103.0 | 0.7 | −103.0 | 0.7 | −78.2 | 0.7 | −78.2 |
| UHB switch attenuation | 0.7 | −103.7 | 0.7 | −103.7 | 0.7 | −78.9 | 0.7 | −78.9 |
| UHB switch H3 | −125 | −103.6 | −105 | −101.3 | −125 | −78.9 | −105 | −78.9 |
| n38 Rx filter attenuation | 1.5 | −105.1 | 1.5 | −102.8 | 1.5 | −80.4 | 1.5 | −80.4 |
| n38 Rx filter H3 | −105 | −102.1 | −105 | −100.7 | −105 | −80.4 | −105 | −80.4 |
| B20 PA to n38 LNA isolation | 65 | −87.5 | 65 | −87.5 | 65 | −87.5 | 65 | −87.5 |
| Composite |  | −87.4 |  | −87.3 |  | −79.6 |  | −79.6 |
| MSD level after MRC |  | 11.0 dB (10 MHz) | | | | 18.5 dB (10 MHz) | | |

From the results, the 3rd harmonic may impact to the NR Band n38 SL receiver sensitivity levels for both RF architectures. Also the harmonic trap filter will improve the sensitivity level up to 8 dB enhance the REFSENS level when RAN4 consider the share antenna RF architecture. Based on the REFSENS analysis results, MSD levels for 1.0 MHz CBW (channel bandwidth) with 11.0 dB based on shared antenna RF architecture with HTF is proposed.

4. Additional ILs and MSD Analysis for DC_20A_n38A

For both DC_20A_n38A and V2X_20A_n38A might consider same RF architecture except HTF since there was no difference for DC operation and V2X concurrent operation.

However, the 3rd harmonic from Band 20 fall into n38 receiving operating frequency for both DC_20A_n38A and V2X_20A_n38A. In DC_20A_n38A, the additional ILs was specified as table 10.

TABLE 10

| Inter-band EN-DC configuration | E-UTRA or NR Band | $\Delta T_{IB,c}$ (dB) |
| --- | --- | --- |
| DC_20_n38 | 20 | 0.3 |
|  | n38 | 0.3 |

The 0.3 dB IL level is generally derived by diplexer insertion loss term which is added in single band n38 UE or Band 20 UE to support inter-band DC combinations. So, in DC_20A_n38A Harmonic trap filter is not considered even though the 3rd harmonic from Band 20 transmission will be impact to the n38 receiving frequency band.

Furthermore, MSD level by 3rd harmonic problem is specified as table 11.

TABLE 11

| | | E-UTRA or NR Band/Channel bandwidth of the affected DL band/MSD | | | | | | | | | | | |
| --- | --- | --- | --- | --- | --- | --- | --- | --- | --- | --- | --- | --- | --- |
| UL band | DL band | 5 MHZ (dB) | 10 MHZ (dB) | 15 MHZ (dB) | 20 MHZ (dB) | 25 MHZ (dB) | 30 MHZ (dB) | 40 MHZ (dB) | 50 MHZ (dB) | 60 MHZ (dB) | 80 MHZ (dB) | 90 MHZ (dB) | 100 MHZ (dB) |
| 1, 3 | n77$^{2,13}$ |  | 23.9 | 22.1 | 20.9 |  |  | 17.9 | 16.8 | 16.0 | 14.8 | 14.3 | 13.8 |
|  | n77$^{3}$ |  | 1.1 | 0.8 | 0.3 |  |  |  |  |  |  |  |  |
| 2 | n48$^{2,13}$ |  | 27.3 | 24.4 | 22.4 | 21.2 |  | 18 | 17.1 | 16.3 | 15 | 14.5 | 14 |
|  | n48$^{3}$ |  | 1.9 | 1.4 | 0.9 | 0.4 |  | 0 | 0 | 0 | 0 | 0 | 0 |
| ... | ... |  | ... | ... | ... | ... |  | ... | ... | ... |  |  |  |
| 20 | n38$^{8,9}$ |  | 12.9 | 10.3 | 8.4 | 7.4 |  |  |  |  |  |  |  |

However, the 10.3 dB MSD level for 10 MHz CBW is quite different with MSD results from interested companies for V2X_20A_n38A.19.2 dB MSD level may be proposed when V2X_20A_n38A UE do not consider HTF with shared antenna RE architecture which is same architecture of DC_20A_n38A UE.

But, when HTF as same V2X_20A_n38A UE architecture is considered, the required MSD level is 11.6 dB by 3rd harmonic problems.

So, both DC_20A_n38A and V2X_20A_n3SA may have same RF architecture. And additional ILs and MSD levels for each DC_20A_n28A or V2X_20A_n38A can be decided.

To solve this problem, there are three candidate options for both DC_20A_n38A UE and V2X_20A_n38A UE as follow Option 1: Consider same RF architecture without HTF
Keep additional ILs but need to revise MSD level for DC_20A_n38A and apply both DC_20A_n38A and V2X_20A_n38A.
Higher MSD level is expected to both DC_20A_n38A and V2X_20A_n38A.
Option 2: Consider same RF architecture with HTF
Need to revise the additional ILs and MSD for DC_20A_n38A, then apply to V2X_20A_n38A
Lower MSD level is expected to both DC_20A_n38A and V2X_20A_n38A but 0.2 dB ILs will be added in DC_20A_n38A.
Option 3: Consider different RF architecture
For DC_20A_n38A, keep the additional ILs without HTF but revise MSD level for DC_20A_n38A UE without HTF.
Consider HTF for V2X_20A_n38A UE based on RAN4 agreements, define additional ILs on top of ILs of DC_20A_n38A and the new MSD levels with HTF applied to V2X_20A_n38A.

Among the above 3 candidate options, option2 and option3 to finalize the RF architecture and MSD requirements for both DC_20A_n38A and V2X_20A_n38A are preferred. Because the harmonic trap filter will improve the sensitivity level up to 8 dB enhance the REFSENS level when the share antenna RF architecture is considered to solve the 3rd harmonic problems.

Based on the analysis results, considering option2 or option3 to solve the RE architecture and MSD problems for DC_20A_n38A UE and V2X_20A_n38A UE are proposed.

This specification is about the option 2. That is, architecture of V2X_20A_n38A may be same architecture of DC_20A_n38A.

The followings is under condition of same architecture V2X_20A_n38A with DC_20A_n38A.

5. Proposed Requirements for DC_20A_n38A UE and V2X_20A_n38A

Table 12 is $\Delta T_{IB,c}$ due to EN-DC (two bands).

TABLE 12

| Inter-band EN-DC configuration | E-UTRA or NR Band | $\Delta T_{IB,c}$ (dB) |
| --- | --- | --- |
| DC_20_n38 | 20 | 0.5 |
|  | n38 | 0.3 |
| ... | ... | ... |
| DC_1-20_n38 | 1 | 0.5 |
|  | 20 | 0.5 |
|  | n38 | 0.5 |
| ... | ... | ... |
| DC_3-20_n38 | 3 | 0.5 |
|  | 20 | 0.5 |
|  | n38 | 0.5 |
| ... | ... | ... |
| DC_1-3-20_n38 | 1 | 0.5 |
|  | 3 | 0.5 |
|  | 20 | 0.5 |
|  | n38 | 0.5 |

The values for $\Delta T_{IB,c}$ in above table could have ±α tolerance and α can be 0 dB, 0.1 dB, 0.2 dB, 0.3 dB, 0.4 dB, 0.5 dB, ... 1 dB, 1.5 dB, 2 dB, 2.5 dB, and 3 dB. Table 13 is $\Delta T_{IB,V2X}$ for inter-band con-current V2X operation (two bands).

TABLE 13

| V2X con-current operating band Configuration | Operating Band | ΔTIB, V2X [dB] |
| --- | --- | --- |
| V2X_20A_n38A | 20 | 0.0[1] |

Note:
[1]The $\Delta T_{IB,V2X}$ is applied on top of $\Delta T_{IB,c}$ of DC_20A_n38A to reduce 3rd harmonic impact from Band 20.

The above $\Delta T_{IB,V2X}$ is changing value from $\Delta T_{IB,c}$ at DC_20_n38. Therefore, $T_{IB,V2X}$ to apply to V2X_20_n38 is 0.3 dB because sum of $\Delta T_{IB,c}$ and $\Delta T_{IB,V2X}$ is 0.3 dB. In lte system, standard of $\Delta T_{IB,V2X}$ is single carrier. In NR V2X, standard of $\Delta T_{IB,V2X}$ may be DC.

Table 14 is Reference sensitivity exceptions (MSD) due to UL harmonic for EN-DC in NR FR1.

TABLE 14

| E-UTRA or NR Band/Channel bandwidth of the affected DL band/MSD | | | | | | | | | | | | | |
| --- | --- | --- | --- | --- | --- | --- | --- | --- | --- | --- | --- | --- | --- |
| UL band | DL band | 5 MHZ (dB) | 10 MHZ (dB) | 15 MHZ (dB) | 20 MHZ (dB) | 25 MHZ (dB) | 30 MHZ (dB) | 40 MHZ (dB) | 50 MHZ (dB) | 60 MHZ (dB) | 80 MHZ (dB) | 90 MHZ (dB) | 100 MHZ (dB) |
| 1, 3 | n77[2,13] |  | 23.9 | 22.1 | 20.9 |  |  | 17.9 | 16.8 | 16.0 | 14.8 | 14.3 | 13.8 |
|  | n77[3] |  | 1.1 | 0.8 | 0.3 |  |  |  |  |  |  |  |  |
| 2 | n48[2,13] | 27.3 | 24.4 | 22.4 | 21.2 |  |  | 18 | 17.1 | 16.3 | 15 | 14.5 | 14 |
|  | n48[3] | 1.9 | 1.4 | 0.9 | 0.4 |  |  | 0 | 0 | 0 | 0 | 0 | 0 |
| ... | ... | ... | ... | ... | ... | ... |  | ... | ... | ... |  |  |  |
| 20 | n38[8,9] |  | 13.4 | 10.7 | 8.5 | 7.7 |  |  |  |  |  |  |  |

The values for the MSD in above table could have ±α tolerance and α can be 0 dB, 0.1 dB, 0.2 dB, 0.3 dB, 0.4 dB, 0.5 dB, ... 1 dB, 1.5 dB, 2 dB, 2.5 dB, and 3 dB.

<Proposed MSD Level for V2X_20_n38>

As shown in FIG. 9, if the UE transmits uplink signals via uplink bands of operating bands 20, a reference sensitivity in operating band n38 is degraded. Therefore, a value of MSD is needed to apply the reference sensitivity.

Table 15 shows MSD exception for Scell due to V2X_20_n38.

Sensitivity degradation is allowed for a band if it is impacted by UL harmonic interference from another band part of the inter-band con-current V2X LE. Reference sensitivity exceptions (MSD) for the victim band (high) are specified in Table 15 with uplink configuration of the aggressor band (low) specified in Table 16.

TABLE 15

| V2X inter-band con-current band combinations V2X_20_n38 | UL band | SI operation | Operating Bands/Channel bandwidth of the affected DL band/MSD | | | |
|---|---|---|---|---|---|---|
| | | | 10 MHz (dB) | 20 MHz (dB) | 30 MHz (dB) | 40 MHz (dB) |
| | 20 | n38 | 10.7 | 7.7 | 5.8 | 4.7 |

NOTE 1:
These requirements apply when there is at least one individual RE within the uplink transmission bandwidth of the aggressor (lower) for which the 3rd transmitter harmonic band. is within the sidelink transmission bandwidth of a victim (higher) band.
NOTE 2:
The requirements should be verified for UL EARFCN of the aggressor (lower) band (superscript LB such that $f_{UL}^{LB} = [f_{DL}^{HB}/0.3]0.1$ in MHz and $F_{UL low}^{LB} + BW_{Channel}^{LB}/2 \le f_{UL}^{LB} \le f_{UL high}^{LB} - BW_{Channel}^{LB}/2$ the carrier frequency in the victim (higher) band in MHz and $BW_{Channel}^{LB}$ the channel bandwidth configured in the low band.
NOTE 3:
The MSD level applied to all supported SCSs in victim band.

The values for the MSD in above table could have ±α tolerance and α can be 0 dB, 0.1 dB, 0.2 dB, 0.3 dB, 0.4 dB, 0.5 dB, ... 1 dB, 1.5 dB, 2 dB, 2.5 dB, and 3 dB.

That is, for preventing a reference sensitivity in operating band n38 from degrading by 3rd harmonic, the harmonic filter are used for V2X_20A_n38A. Even though using harmonic trap filter, the interference problem is not eliminated in own Rx bands as shown in Table 8 and Table 9. Therefore, the MSD levels in Table 15 may be proposed to relax the REFSENS requirements. It means that the current REFSENS −96.5 dBm for 10 MHz CBW may be relaxed with 10.7 dB. Then, −85.8 dBm REFSENS may be applied to in n38 for V2X_20A_n38A.

Table 16 is Uplink configuration for reference sensitivity exceptions due to UL harmonic interference for inter-band con-current V2X in NR FR1.

TABLE 16

| E-UTRA or NR Band/Channel bandwidth of the affected DL band/UL RB allocation of the aggressor band | | | | | |
|---|---|---|---|---|---|
| UL band | SL operation | 10 MHz ($L_{CRB}$) | 20 MHz ($L_{CRB}$) | 30 MHz ($L_{CRB}$) | 40 MHz ($L_{CRB}$) |
| 20 | n38 | 25 | 50 | 50 | 50 |

NOTE 1:
The UL configuration applies regardless of the channel bandwidth of the UL band unless the UL resource blocks exceed that specified for the uplink bandwidth in which case the allocation $L_{CRB}$ is length of a contiguous resource block allocation. $L_{CRB}$ is 25 when the CBW (channel bandwidth) for receiving the sidelink signal (n38) is 10 MHz.

$L_{CRB}$ is 50 when the CBW for receiving, the sidelink signal (n38) is 20 MHz.

$L_{CRB}$ is 50 when the CBW for receiving the sidelink signal (n381 is 30 MHz.

$L_{CRB}$ is 50 when the CBW for receiving the sidelink signal (n38) is 40 MHz.

Table 17 is $\Delta R_{IB,c}$ due to EN-DC (two bands).

TABLE 17

| Inter-band EN-DC configuration | E-UTRA or NR Band | $\Delta R_{IB,c}$ (dB) |
|---|---|---|
| ... | ... | ... |
| DC_20_n38 | 20 | 0.2 |
| | n38 | 0.0 |
| ... | ... | ... |
| DC_3-20-38_n78 | 3 | 0.2 |
| DC_3-20_n38-n78 | 20 | 0.2 |
| | 38 or n38 | 0.4 |
| | n78 | 0.5 |
| ... | ... | .. |
| DC_1-3-20-38_n78 | 3 | 0.2 |
| DC_1-3-20_n38-n78 | 20 | 0.2 |
| | 38 or n38 | 0.4 |
| | n78 | 0.5 |

The values for the $\Delta R_{IB,c}$ in above table could have ±α tolerance and α can be 0 dB, 0.1 dB, 0.2 dB, 0.3 dB, 0.4 dB, 0.5 dB, ... 1 dB, 1.5 dB, 2 dB, 2.5 dB, and 3 dB. The ILs based on transmitting uplink signal via operating band 20 in DC_20_n38 is 0.2 dB.

Table 18 is $\Delta R_{IB,V2X}$ for two bands.

TABLE 18

| V2X inter-band con-current band Combination | V2X operating Band | ΔRIB, V2X [dB] |
|---|---|---|
| V2X_20_n38 | 20 | 0.0[1] |

Note:
[1]The $\Delta R_{IB,V2X}$ is applied on top of $\Delta R_{IB,c}$ of DC_20_n38 to reduce 3rd harmonic impact from Band 20.

The above $\Delta R_{IB,V2X}$ is changing value from $\Delta R_{IB,c}$ at DC_20_n38. Therefore, $R_{IB,V2X}$ to apply to V2X_20_n38 is 0.3 dB because sum of $\Delta R_{IB,c}$ and $\Delta R_{IB,V2X}$ is 0.3 dB. In lte system, standard of $\Delta T_{IB,V2X}$ is single carrier. In NR V2X, standard of $\Delta R_{IB,V2X}$ may be DC.

Figure 10:
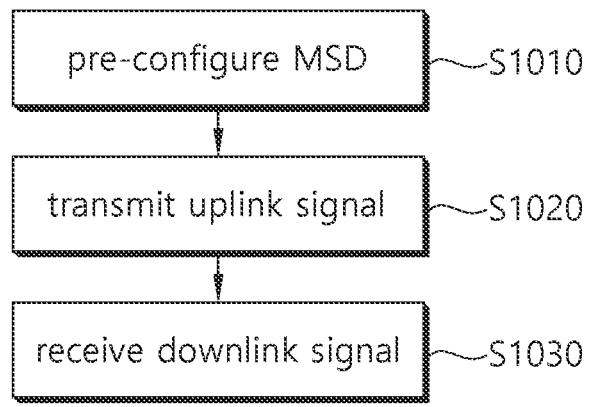
FIG. 10 is a flow chart showing an example of a procedure of a terminal according to the present disclosure.

FIG. 10 is a flow chart showing an example of a procedure of a terminal according to the present disclosure.

Referring to FIG. 10, steps S1010 to S1030 are shown. Operations described below may be performed by the terminal.

For reference, step S1010 may not always be performed when the terminal performs communication. For example, step S1010 may be performed only when the reception performance of the terminal is tested.

In step S1010, the terminal may preset the above proposed MSD value. For example, the terminal may preset the MSD values in Table 15. For example, for the combination of the V2X_n38A downlink band and the V2X_20 uplink band, an MSD of 10.7 dB for 10 MHz bandwidth for uplink may be applied to the reference sensitivity of the downlink band n38, an MSD of 7.7 dB for 20 MHz bandwidth for uplink may be applied to the reference sensitivity of the downlink band n38, an MSD of 5.8 dB for 30 MHz bandwidth for uplink may be applied to the reference sensitivity of the downlink band n38, an MSD of 4.7 dB for 40 MHz bandwidth for uplink may be applied to the reference sensitivity of the downlink band n38.

In step S1020, the terminal may transmit the uplink signal.

When the combination of the V2X_n38A downlink band and the V2X_20 uplink band is configured in the terminal, the terminal may transmit the uplink signal through the uplink operating bands 20.

In step S1030, the terminal may receive the downlink signal.

The terminal may receive the downlink signal based on the reference sensitivity of the downlink band n38, to which the MSD value is applied.

When the combination of the V2X_n38A downlink band and the V2X_20 uplink band is configured in the terminal, the terminal may receive the downlink signal through the downlink operating band n38.

For reference, the order in which steps S1020 and S1030 are performed may be different from that shown in FIG. 10. For example, step S1030 may be performed first and then step S1020 may be performed. Alternatively, step S1020 and step S1030 may be performed simultaneously. Alternatively, the time when step S1020 and step S1030 may be may overlap partially.

Hereinafter, an apparatus for operating in a wireless communication system, according to some embodiments of the present disclosure, will be described.

For example, a terminal may include a processor, a transceiver, and a memory.

For example, the processor may be configured to be coupled operably with the memory and the processor.

The processor may be configured to transmitting an uplink signal via operating band 20; and receiving a sidelink signal is operation band n38, wherein a value of Maximum Sensitivity Degradation (MSD) is applied to a reference sensitivity for receiving the sidelink signal, wherein based on bandwidth for receiving the sidelink signal being 10 MHz, the value of the MSD is 10.7 dB, wherein based on bandwidth for receiving the sidelink signal being 20 MHz, the value of the MSD is 7.7 dB, wherein based on bandwidth for receiving the sidelink signal being 30 MHz, the value of the MSD is 5.8 dB, wherein based on bandwidth for receiving the sidelink signal being 40 MHz, the value of the MSD is 4.7 dB.

Hereinafter, a processor for operating in a wireless communication system, according to some embodiments of the present disclosure, will be described.

The processor may be configured to transmitting an uplink signal via operating band 20; and receiving a sidelink signal vis operation band n38, wherein a value of Maximum Sensitivity Degradation (MSD) is applied to a reference sensitivity for receiving the sidelink signal, wherein based on bandwidth for receiving the sidelink signal being 10 MHz, the value of the MSD is 10.7 dB, wherein based on bandwidth for receiving the sidelink signal being 20 MHz, the value of the MSD is 7.7 dB, wherein based on bandwidth for receiving the sidelink signal being 30 MHz, the value of the MSD is 5.8 dB, wherein based on bandwidth for receiving the sidelink signal being 40 MHz, the value of the MSD is 4.7 dB.

Hereinafter, a non-transitory computer-readable medium has stored thereon a plurality of instructions for operating in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a device.

The stored a plurality of instructions may cause the device to transmitting an uplink signal via operating band 20; and receiving a sidelink signal vis operation band n38, wherein a value of Maximum Sensitivity Degradation (MSD) is applied to a reference sensitivity for receiving the sidelink signal, wherein based on bandwidth for receiving the sidelink signal being 10 MHz, the value of the MSD is 10.7 dB, wherein based on bandwidth r receiving the sidelink signal being 20 MHz, the value of the MSD is 7.7 dB, wherein based on bandwidth for receiving the sidelink signal being 30 MHz, the value of the MSD is 5.8 dB, wherein based on bandwidth for receiving the sidelink signal being 40 MHz, the value of the MSD is 4.7 dB.

The present disclosure can have various advantageous effects.

For example, by performing disclosure of this specification, UE can transmit signal by applying MSD value.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claims) and apparatus claim(s) can be combined to be implemented or performed in a method. Other implementations are within the scope of the following claims.

What is claimed is:

1. A device configured to perform V2X (Vehicle to Everything) communication, the device comprising:
   a transceiver,
   at least one processor operably connectable to the transceiver, and
   at least one memory operably connectable to the at least one processer and storing instructions that, based on being executed by the at least one processor, perform operations comprising:
   transmitting an uplink signal via operation band 20, and
   receiving a sidelink signal vi a operation band n38 (New Radio operating band 38),
   wherein Maximum Sensitivity Degradation (MSD) is applied to a reference sensitivity for receiving the sidelink signal,
   wherein based on bandwidth for receiving the sidelink signal being 10 MHz, the MSD is 10.7 dB,
   wherein based on bandwidth for receiving the sidelink signal being 20 MHz, the MSD is 7.7 dB,
   wherein based on bandwidth for receiving the sidelink signal being 30 MHz, the MSD is 5.8 dB, and
   wherein based on bandwidth for receiving the sidelink signal being 40 MHz, the MSD is 4.7 dB.

2. The device of claim 1,
   wherein $L_{CRB}$ (length of a contiguous resource block allocation) is 25, based on the bandwidth for receiving the sidelink signal being 10 MHz.

3. The device of claim 1,
   wherein $L_{CRB}$ is 50, based on the bandwidth for receiving the sidelink signal being 20 MHz.

4. The device of claim 1,
   wherein $L_{CRB}$ is 50, based on the bandwidth for receiving the sidelink signal being 30 MHz.

5. The device of claim 1,
   wherein $L_{CRB}$ is 50, based on the bandwidth for receiving the sidelink signal being 40 MHz.

6. The device of claim 1,
   wherein the reference sensitivity is relaxed, based on delta $R_{IB}$ (Allowed reference sensitivity relaxation), and
   wherein the delta $R_{IB}$ is 0.3 dB.

7. The device of claim 1, wherein the operations further comprise:
   determining output power for transmitting the uplink signal,
   wherein the transmitting the uplink signal is performed based on the determined output power for transmitting the uplink signal,
   wherein the output power is relaxed, based on delta $T_{IB}$ (Allowed maximum configured output power relaxation), and
   wherein the delta $T_{IB}$ is 0.2 dB.

8. A method performed by a device, the method comprising:
   transmitting an uplink signal via operating band 20; and
   receiving a sidelink signal via operation band n38 (New Radio operating band 38),
   wherein Maximum Sensitivity Degradation (MSD) is applied to a reference sensitivity for receiving the sidelink signal,
   wherein based on bandwidth for receiving the sidelink signal being 10 MHz, the MSD is 10.7 dB,
   wherein based on bandwidth for receiving the sidelink signal being 20 MHz, the MSD is 7.7 dB,
   wherein based on bandwidth for receiving the sidelink signal being 30 MHz, the MSD is 5.8 dB, and
   wherein based on bandwidth for receiving the sidelink signal being 40 MHz, the MSD is 4.7 dB.

9. The method of claim 8,
   wherein $L_{CRB}$ (length of a contiguous resource block allocation) is 25, based on the bandwidth for receiving the sidelink signal being 10 MHz.

10. The method of claim 8,
    wherein $L_{CRB}$ is 50, based on the bandwidth for receiving the sidelink signal being 20 MHz.

11. The method of claim 8,
    wherein $L_{CRB}$ is 50, based on the bandwidth for receiving the sidelink signal being 30 MHz.

12. The method of claim 8,
    wherein $L_{CRB}$ is 50, based on the bandwidth for receiving the sidelink signal being 40 MHz.

13. The method of claim 8,
    wherein the reference sensitivity is relaxed, based on delta $R_{IB}$ (Allowed reference sensitivity relaxation), and
    wherein the delta $R_{IB}$ is 0.3 dB.

14. The method of claim 8, further comprising:
    determining output power for transmitting the uplink signal,
    wherein the transmitting the uplink signal is performed based on the determined output power for transmitting the uplink signal,
    wherein the output power is relaxed, based on delta $T_{IB}$ (Allowed maximum configured output power relaxation), and
    wherein the delta $T_{IB}$ is 0.2 dB.

* * * * *